United States Patent [19]

Oswald et al.

[11] Patent Number: 4,526,344
[45] Date of Patent: Jul. 2, 1985

[54] AUXILIARY LIFT ADAPTER

[75] Inventors: Norman D. Oswald; Robert R. Dean, both of Duncanville; Harry S. Mankey, Dallas, all of Tex.

[73] Assignee: Standard Manufacturing Co., Inc., Dallas, Tex.

[21] Appl. No.: 426,232

[22] Filed: Sep. 28, 1982

[51] Int. Cl.³ .............................................. B60P 1/48
[52] U.S. Cl. .................................... 254/9 C; 254/122
[58] Field of Search .............. 254/9 R, 9 B, 9 C, 122, 254/124, 126; 187/18; 182/69, 157, 158; 414/911, 589, 590

[56] References Cited

U.S. PATENT DOCUMENTS

| | | | |
|---|---|---|---|
| 2,355,341 | 8/1944 | Trimbach . | |
| 2,417,553 | 3/1947 | Jensen | 269/289 M |
| 2,471,901 | 5/1949 | Ross | 254/9 C |
| 2,764,869 | 10/1956 | Scherr | 254/9 C |
| 2,920,773 | 1/1960 | Knabe . | |
| 2,931,519 | 4/1960 | Beach | 254/9 R |
| 2,937,003 | 5/1960 | Croll . | |
| 2,940,769 | 6/1960 | Taylor | 254/9 C |
| 2,956,408 | 10/1960 | Fowler . | |
| 3,341,042 | 9/1967 | Carder . | |
| 3,472,547 | 10/1969 | London . | |
| 3,524,556 | 8/1970 | Miller | 414/589 |
| 3,758,076 | 9/1973 | Tranchero . | |
| 3,928,946 | 12/1975 | Wynn | 254/126 |
| 4,223,693 | 9/1980 | Kosarzecki . | |
| 4,299,375 | 11/1981 | Schosek | 254/29 R |

FOREIGN PATENT DOCUMENTS 527377  5/1977  U.S.S.R. ............................. 254/122

OTHER PUBLICATIONS

MHU-33/M—Drawing #60746045.
MHU-7/M—Drawing #T1 H201J.

Primary Examiner—Robert C. Watson
Attorney, Agent, or Firm—Michael A. O'Neil

[57] ABSTRACT

An auxiliary lift adapter (10) comprises spaced, parallel top load beams (40), bottom load beams (30) positioned beneath the top load beams, and scissors mechanisms (50) for raising and lowering the top load beams (40). Each scissors mechanism (50) comprises an exterior arm (52) pivotally connected to its bottom load beam (30) and slidably connected to its top load beam (40), an interior arm (54) pivotally connected to its top load beam (40) and slidably connected to its bottom load beam (30), and a pin (56) pivotally interconnecting the midpoints of the arms. Hydraulic cylinders (76) are provided for actuating the scissors mechanisms (50) and include safety locking valves for preventing operation of the cylinders in the event of loss of hydraulic pressure.

8 Claims, 6 Drawing Figures

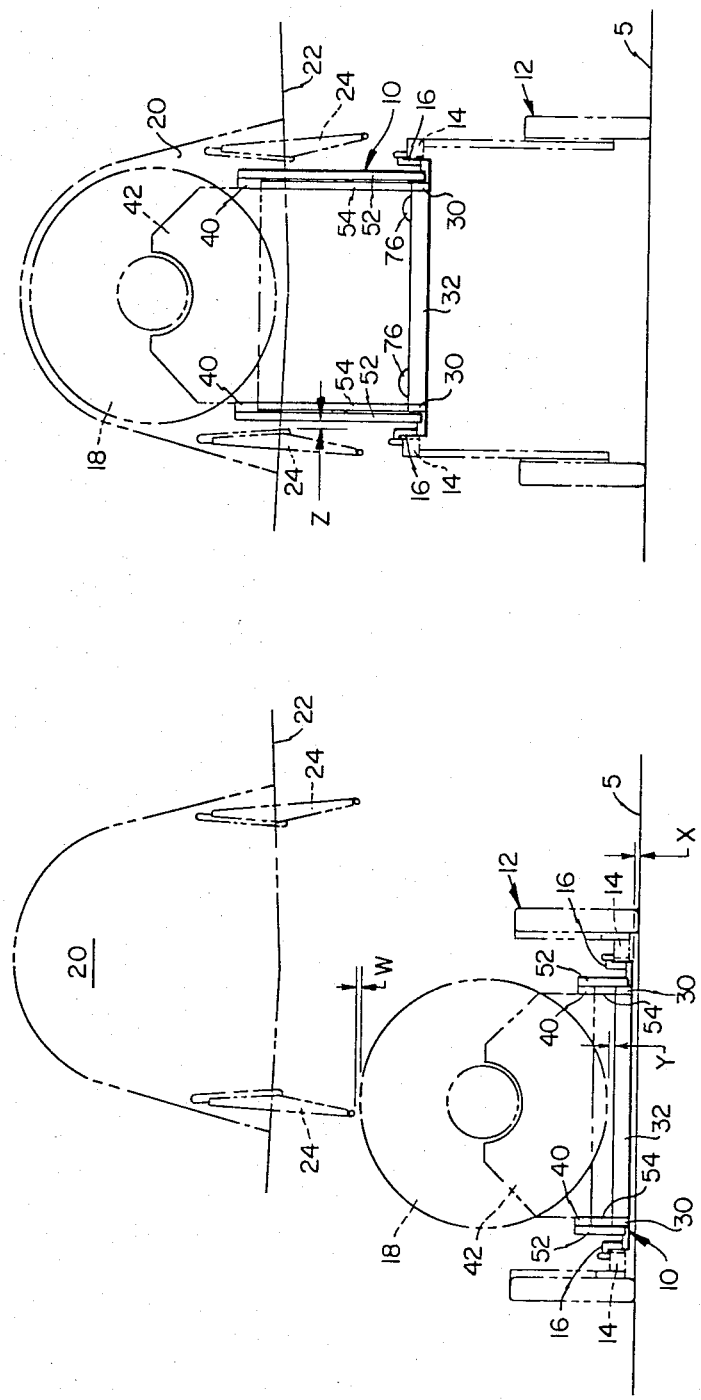

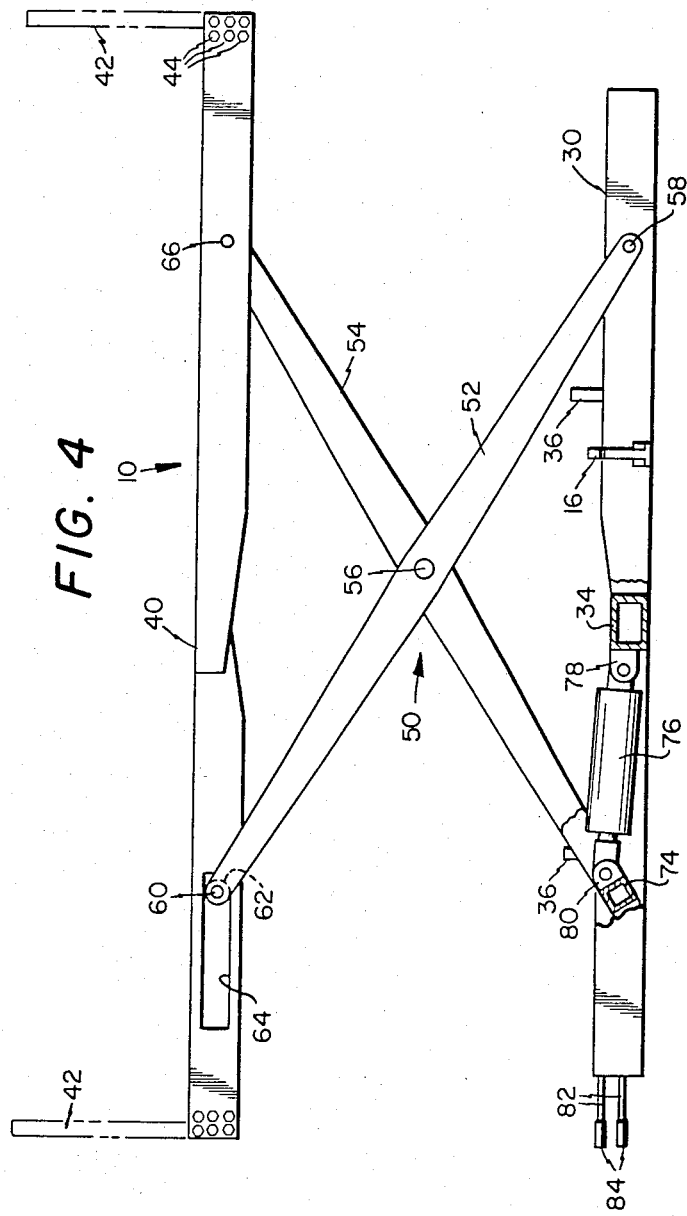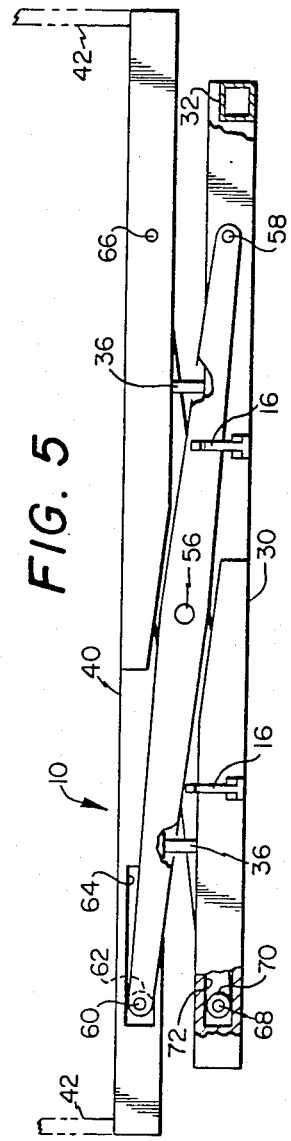

4,526,344

AUXILIARY LIFT ADAPTER

TECHNICAL FIELD

An auxiliary lift adapter for positioning a large diameter weapons launcher package beneath an aircraft, and then lifting the weapons launcher package into the weapons bay of the aircraft.

BACKGROUND AND SUMMARY OF THE INVENTION

In modern aerial warfare a plurality of weapons may be mounted in a weapons launcher package. The weapons launcher package is in turn installed in the weapons bay of an aircraft. During an attack weapons are delivered sequentially from the weapons launcher package through the weapons bay door of the aircraft.

Such a weapons launcher package can be quite large in diameter, for example, one form of weapons launcher package has a diameter of 75 inches. The weapons launcher package must be manipulated under the receiving aircraft, and then lifted upwardly into the weapons bay of the aircraft. In one particular aircraft the spacing between the bottoms of the weapons bay doors when open and the underlying surface is 84 inches. It will thus be understood that apparatus for positioning and lifting a weapons launcher package relative to such an aircraft must have an absolute minimum vertical dimension when in the lowered condition in order to allow the necessary clearance between the weapons launcher package and the open weapons bay doors of the aircraft.

The present invention comprises an auxiliary lift adapter for receiving, transporting and lifting a weapons launcher package which fulfills the objective of permitting the weapons launcher package to be manipulated under the open weapons bay doors of an aircraft and then lifted into the weapons bay of the aircraft. In accordance with the broader aspects of the invention, this is accomplished by locating the entire lifting mechanism of the auxiliary lift adapter in spaces which exist between the exterior of the weapons launcher package and vertical and horizontal planes extending tangent to the sides and the bottom of the weapons launcher package, respectively. By this means there is provided an auxiliary lift adapter which is characterized by minimum vertical dimensions when in the lowered condition and yet is fully adapted to lift a weapons launcher package into the weapons bay of an aircraft.

More specifically, the auxiliary lift adapter of the preseent invention comprises parallel top load beams for supporting a large diameter cylindrical object. The top load beams are spaced apart a distance substantially less than the diameter of the cylindrical object, and the cylindrical object is supported on the top load beams with the lower portion thereof extending beneath the top load beams. Bottom load beams are positioned directly beneath the top load beams, and scissors mechanisms are employed to raise and lower the top load beams relative to the bottom load beams. Each scissors mechanism includes an exterior arm pivotally connected to its bottom load beams and slidably connected to its top load beam, an interior arm pivotally connected to its top load beam and slidably connected to its bottom load beam, and a pin pivotally connecting the midregions of the arms. Hydraulic cylinders are used to actuate the scissors mechanisms. Each hydraulic cylinder is provided with a safety locking valve for preventing operation thereof in the event of loss of hydraulic pressure, and each hydraulic cylinder is adapted to support the cylindrical object in the event of failure or disengagement of the other cylinder.

DESCRIPTION OF THE DRAWINGS

A more complete understanding of the invention may be had by reference to the following Detailed Description when taken in conjunction with the accompanying Drawings, wherein:

FIG. 1 is an end view illustrating the auxiliary lift adapter of the present invention in the lowered condition;

FIG. 2 is a view similar to FIG. 1 showing the auxiliary lift adapter in the raised condition;

FIG. 4 is an enlarged side view of the auxiliary lift adpater wherein certain parts have been broken away more clearly to illustrate certain features of the invention, and wherein the auxiliary lift adapter is shown in the raised condition;

FIG. 5 is a view similar to FIG. 4 showing the auxiliary lift adapter in the lowered condition.

DETAILED DESCRIPTION

Figure 3:
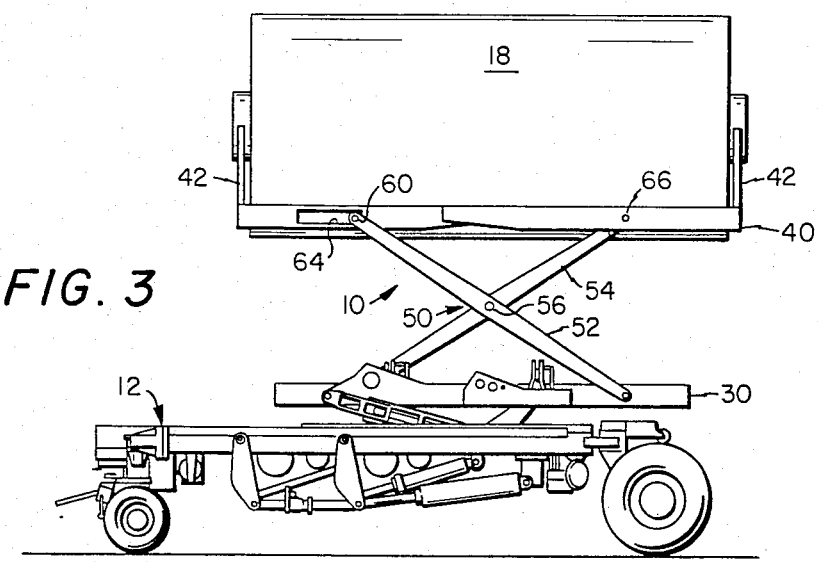
FIG. 3 is a side view of the auxiliary lift adapter of the present invention.

Referring now to the Drawings, and particularly to FIGS. 1, 2, and 3 thereof, there is shown an auxiliary lift adapter 10 incorporating the present invention. An auxiliary lift adapter 10 is used in conjunction with a weapons lifting trailer 12 of the type adapted to receive, transport and lift weapons to facilitate the attachment of the weapons to aircraft. Preferably, the trailer 12 is of the type manufactured by Standard Manufacturing Company, Inc. of Dallas, Tex. and identified by that company as a model MHU-M23/M weapons lifting trailer.

As is best shown in FIGS. 1 and 2, the weapons lifting trailer 12 includes posed, longitudinally extending load beams 14. In use, the weapons lifting trailer 12 functions to raise and lower the load beams 14 between the positions shown in FIGS. 1 and 2, respectively. The auxiliary lift adapter 10 of the present invention is connected to the load beams 14 of the trailer 12 by means of four trailer pickup adapters 16. Actuation of the lifting trailer 12 to raise the load beams 14 from the positions shown in FIG. 1 to the positions shown in FIG. 2 likewise effects vertical movement of the auxiliary lift adapter 10 from the position shown in FIG. 1 to the position shown in FIG. 2.

FIGS. 1 and 2 further illustrate an important feature of the present invention. The purpose of the auxiliary lift adapter 10 is to load a weapons package 18 into the weapons bay 20 of an aircraft 22. Weapons bay 20 of the aircraft 22 has weapons bay doors 24 which are shown in the open position in FIGS. 1 and 2.

The weapons package 18 has a diameter of 75 inches. The clearance between the open weapons bay doors 24 and the underlying surface 5 is 84 inches. The function of the lifting trailer 12 and the auxiliary lift adapter 10 is to position the weapons package 18 beneath the weapons bay 20, and thereafter to lift the weapons package 18 into the weapons bay 20. To provide an appreciation of the difficulty involved in the completion of this purpose, dimension W in FIG. 1 is the clearance between the top of the weapons package 18 and the bottom of the weapon bay doors, 24 which is one inch. Dimension X in FIG. 1 illustrates the clearance between the bottom of the auxiliary lift adapter 10 and the underlying surface 5, which is one inch. Dimension Y in FIG. 1 is the clearance between the bottom of weapons package 18 and the top of the cross frame of the auxiliary lift adapter 10, which is two inches. Dimension Z in FIG. 2 illustrates the clearance between the auxiliary lift adapter 10 and the interior surfaces of the weapon bay doors 24, which is $2\frac{1}{2}$ inches.

Because of the foregoing dimensional limitations, it is considered impractical if not impossible to position the lifting mechanism for raising the weapons package 18 into the weapons bay 20 directly beneath the weapons package 18. The present invention takes advantage of the fact that vacant space exists in the "corners" comprising the areas between imaginary vertical planes extending downwardly from the widest points of the weapons package 18 and an imaginary horizontal plane extending outwardly from the lowermost point of the weapons package 18 and intersecting the vertical planes. An important feature of the present invention comprises the fact that the entire operating mechanism of the auxiliary lift adapter 10 is positioned in these corners. This makes possible the lowering of the weapons package 18 sufficiently to allow it to pass under the open weapons bay doors 24 while providing the necessary one inch clearance as represented by the dimension W in FIG. 1, and thereafter the raising of the weapons package 18 into the weapons bay 20 while providing the necessary $2\frac{1}{2}$ inch clearance between the adjacent exterior surfaces of the auxiliary lift adapter 10 and the weapons bay doors 24 as represented by the dimension Z in FIG. 2.

Referring now to FIGS. 4 and 5, the auxiliary lift adapter 10 includes opposed, parallel bottom load beams 30. The load beams 30 are interconnected at each end by a pair of cross frames 32 (only one of which is shown). A cross beam 34 also extends between the two bottom load beams 30 and is relatively centrally disposed between the opposite ends thereof. The four lifting trailer pickup adapters 16 are mounted on the bottom load beams 30. Four transport supports 36 are secured to the bottom load beams 30 and extend upwardly therefrom.

The auxiliary lift adapter 10 further includes opposed, parallel top load beams 40. A pair of brackets 42 are secured to the opposite ends of the top load beams 40 by means of a plurality of fasteners 44. Referring again momentarily to FIGS. 1, 2 and 3, the brackets 42 function to support the weapons package 18 on the auxiliary lift adapter 10. As is best shown in FIG. 5, the top load beams 40 are supported by the transport supports 36 when the auxiliary lift adapter 10 is in the lowered condition.

Raising and lowering of the top load beams 40 and the weapons package 18 carried thereby is effected by means of scissors mechanisms 50 located on opposite sides of the auxiliary lift adapter 10. Each scissors mechanisms 50 includes an exterior lift arm 52 and an interior lift arm 54. The arms 52 and 54 of each scissors mechanism 50 are pivotally secured to each other by means of a pin 56 located approximately at the midpoints of the arms 52 and 54.

Each exterior lift arm 52 is pivotally secured to its bottom load beam 30 by a pin 58. At the opposite end of the exterior lift arm 52 a pin 60 pivotally supports a roller 62 which is received in a slot 64 formed in the corresponding top load beam 40.

Each interior lift arm 54 is pivotally connected to its top load beam 40 by a pin 66. At the opposite end of each interior lift arm 54 a pin 68 pivotally supports a roller 70 which is received in a slot 72 provided in the inside surface of the corresponding bottom load beam 30.

The lower ends of the two interior lift arms 54 are interconnected by a cross frame 74. A pair of hydraulic lift cylinders 76 are provided on opposite sides of the auxiliary lift adapter 10 for raising and lowering the top load beams 40 relative to the bottom load beams 30. The cylinders 76 are connected between the cross beam 34 and cross frame 74 by means of brackets 78 and 80, respectively.

An important feature of the present invention comprises the fact that each hydraulic cylinder 76 of the auxiliary lift adapter 10 is provided with an independent safety locking valve, sometimes referred to as a counterbalance valve. It is therefore not possible to lower the top load beams 40 relative to the bottom load beams 30 simply by opening a valve to permit fluid flow out of the hydraulic lift cylinders 76. To the contrary, the top load beams 40 must be driven downwardly by means of pressurized hydraulic fluid supplied to the hydraulic cylinders 76 through the safety locking valves thereof.

Therefore, in the unlikely event that a hydraulic line should be cut or hydraulic pressure should otherwise be released from one of the hydraulic cylinders 76, the safety locking valve of the hydraulic cylinder will prevent accidental lowering of the weapons package 18 carried by the top load beams 40. In fact, even the complete physical separation of one of the cylinders 76 from the remaining structure of the auxiliary lift adapter 10 will not cause the weapons package 18 to fall because the remaining hydraulic cylinder 76 is fully capable of supporting the entire load carried by the auxiliary lift adapter 10. Thus, by means of this feature of the invention the weapons package 18 is safely supported and cannot be inadvertently lowered under any conceivable circumstance.

Figure 6:
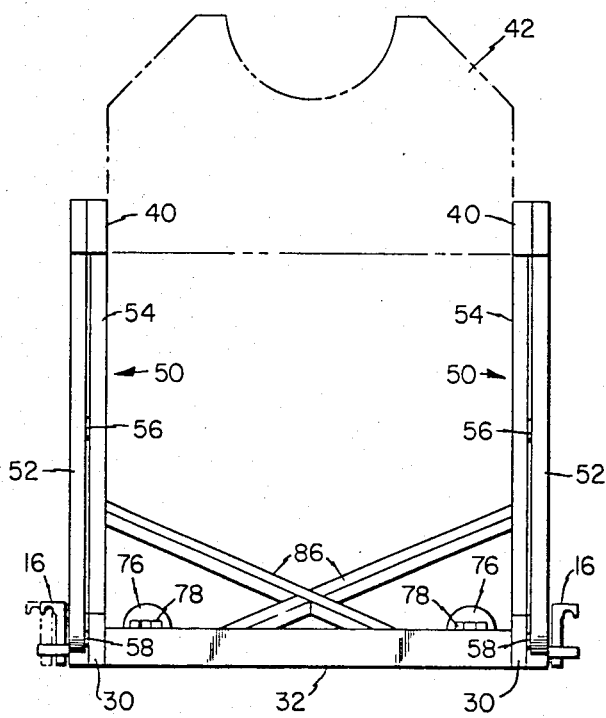
FIG. 6 is an enlarged end view of the auxiliary lift adapter.

Additional features of the invention are illustrated in FIGS. 4 and 6. The cylinders 76 are operated by means of hydraulic fluid which is directed to and from the cylinders 76 through a pair of hydraulic lines 82. The hydraulic lines 82 are in turn connected to a source of pressurized hydraulic fluid through quick disconnect hydraulic couplings 84.

Each of the lifting trailer pickup adapters 16 is selectively positionable either in the position shown in full lines in FIG. 6, or in the position shown in dashed lines. When positioned as shown in full lines, the adapters 16 will not engage the lifting trailer load beams 14 of the lifting trailer 12. When positioned as shown in dashed lines in FIG. 6, the adapters 16 are positioned for engagement with the load beams 14 of the trailer 12 so that the entire auxiliary lift adapter 13 is raised and lowered by means of the trailer 12.

A plurality of cross braces 86 are provided to assure lateral stability of the lifting mechanism of the auxiliary lift adapter 10. Thus, in the event of the disengagement or failure of one of the hydraulic lift cylinders 76, the weapons package 18 must be supported by the remaining lift cylinder 76. The use of the cross braces 86 assures that the top load beam 40 will not twist or tilt sufficiently to drop the weapons package 18 even if one of the cylinders 76 should fail or become disengaged.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

We claim:

1. An auxiliary lift adapter for use with a primary lifting device having a lifting means of a predetermined width, to transport a load vertically through an opening having a lateral dimension which is less than the width of the lifting means of said primary lifting device, comprising:
   a pair of parallel, normally horizontally disposed bottom load beams, the outer lateral surfaces of said bottom load beams being separated by a distance less than the width of the lifting means of said primary lifting device;
   a plurality of cross frames interconnecting the bottom load beams;
   a pair of parallel, normally horizontally disposed top load beams, said top load beams being positioned directly above said bottom load beams and having outer lateral surfaces which are separated by a distance less than the width of the lifting means of said primary lifting device;
   a pair of scissors mechanisms for selectively raising and lowering the top load beams relative to the bottom load beams, each scissors mechanism comprising an exterior arm pivotally connected to its bottom load beam at one end and slidably connected to its top load beam at the other end, an interior arm pivotally connected to its top load beam at one end and slidably connected to its bottom load beam at the other end, and means pivotally interconnecting the arms substantially at the midpoints thereof;
   a plurality of pickup adapters secured to said bottom load beams and extending laterally outwardly therefrom for supporting the auxiliary lift adapter and the load carried thereby by engaging the lifting means of said primary lifting device, wherein said pickup adapters hold the auxiliary lift adapter at a level lower than the level of the lifting means of said primary lifting device when in a lowered position;
   a cross frame interconnecting the lower ends of the interior arms of the scissors mechanisms; and
   a pair of hydraulic cylinders each positioned adjacent one of the bottom load beams and beneath the cylindrical object when the auxiliary lift adapter is in its lowered position, each of the hydraulic cylinders being connected between one of the cross frames interconnecting the bottom load beams and the cross frame interconnecting the lower ends of the interior arms of the scissors mechanisms, said hydraulic cylinders for selective actuation to raise and lower the top load beams and the cylindrical object carried thereby relative to the bottom load beams.

2. The auxiliary lift adapter according to claim 1 wherein each of the hydraulic cylinders includes a safety locking valve for preventing operation of the hydraulic cylinder in the event of loss of hydraulic pressure thereto.

3. The auxiliary lift adapter according to claim 1 further including a plurality of transport supports secured to the bottom load beams and extending upwardly therefrom for supporting the top load beams when the auxiliary lift adapter is in the lowered condition.

4. The auxiliary lift adapter according to claim 1 wherein each of the hydraulic cylinders is adapted to support the top load beams and the cylindrical object carried thereby in the event of failure of the other hydraulic cylinder.

5. The auxiliary lift adapter according to claim 4 further including a plurality of cross braces interconnecting the interior arms of the scissors mechanisms for laterally stablizing the top load beams and the cylindrical object carried thereby.

6. The auxiliary lift adapter according to claim 1 wherein the slidable connection between the lift arms of the scissors mechanisms and the top and bottom load beams comprises rollers rotatably secured to the ends of the arms of the scissors mechanisms and slots formed in the load beams for receiving the rollers.

7. An auxiliary lift adapter for use with a primary lifting device having a lifting means of a predetermined width, to transport a cylindrical object vertically through an opening having a lateral dimension which is less than the width of the lifting means of said primary lifting device, comprising:
   a pair of parallel, normally horizontally disposed bottom load beams, the outer lateral surfaces of said bottom load beams being separated by a distance less than the width of the lifting means of said primary lifting device;
   a plurality of cross frames interconnecting the bottom load beams;
   a pair of parallel, normally horizontally disposed top load beams, said top load beams being positioned directly above said bottom load beams and having outer lateral surfaces which are separated by a distance less than the width of the lifting means of said primary lifting device;
   article receiving members secured between the opposite ends of the top load beam for engaging the opposite ends of the cylindrical object and for supporting the cylindrical object with the lower portion thereof extending substantially beneath the top load beams;
   a pair of parallel, normally horizontally disposed bottom load beams positioned directly beneath the top load beams;
   a plurality of cross frames interconnecting the bottom load beams, one of said cross frames being relatively centrally disposed between the opposite ends of the bottom load beams;
   a pair of scissors mechanisms for selectively raising and lowering the top load beams relative to the bottom load beams, each scissors mechanism comprising an exterior arm pivotally connected to its bottom load beam at one end and slidably connected to its top load beam at the other end, an interior arm pivotally connected to its top load beam at one end and slidably connected to its bottom load beam at the other end, and a pin pivotally interconnecting the arms substantially at the midpoints thereof;
   said sliding connections between the arms of the scissors mechanisms and the top and bottom load beams comprising rollers rotatably secured to the ends of the arms and slots formed in the load beams for receiving the rollers;

a plurality of pickup adapters secured to said bottom load beams and extending laterally outwardly therefrom for supporting the auxiliary lift adapter and the cylindrical object carried thereby by engaging the lifting means of said primary device, wherein said pickup adapters hold the auxiliary lift adapter at a level lower than the level of the lifting means of said primary lifting device when in a lowered position;

a cross frame interconnecting the lower ends of the interior arms of the scissors mechanisms; and a pair of hydraulic cylinders each positioned adjacent one of the bottom load beams and beneath the cylindrical object when the auxiliary lift adapter is in the lowered condition, each of the hydraulic cylinders being connected between the centrally disposed cross frame interconnecting the lower ends of the interior arms of the scissors mechanisms, said hydraulic cylinders adapted for selective actuation to raise and lower the top load beams and the cylindrical object carried thereby relative to the bottom load beams, each of said hydraulic cylinders adapted to support the top load beams and the cylindrical object carried thereby in the event of mechanical failure or disengagement of the other hydraulic cylinder;

each of said hydraulic cylinders having a safety locking valve for preventing operation of the hydraulic cylinder in the event of loss of hydraulic pressure thereto.

8. The auxiliary lift adapter according to claim 7 further including a plurality of transport supports secured to the bottom load beams and extending upwardly therefrom for engaging and supporting the top load beams when the auxiliary lift adapter is in the lowered condition.

* * * * *

UNITED STATES PATENT AND TRADEMARK OFFICE
CERTIFICATE OF CORRECTION

PATENT NO. : 4,526,344

DATED : Jul. 2, 1985

INVENTOR(S) : Oswald et al.

It is certified that error appears in the above-identified patent and that said Letters Patent is hereby corrected as shown below:

Column 1, line 51, "preseent" should read --present--.

Column 4, line 58, "adapter 13" should read --adapter 10--.

Signed and Sealed this

Eighth Day of March, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,526,344

DATED : Jul. 2, 1985

INVENTOR(S) : Oswald et al.

It is certified that error appears in the above-identified patent and that said Letters Patent is hereby corrected as shown below:

Col. 7, line 19, after the word "frame" insert --interconnecting the bottom load beams and the cross frame--.

Signed and Sealed this

Twentieth Day of September, 1988

Attest:

DONALD J. QUIGG

*Attesting Officer*  *Commissioner of Patents and Trademarks*